(12) United States Patent
Cheung et al.

(10) Patent No.: US 8,979,027 B2
(45) Date of Patent: Mar. 17, 2015

(54) WALL INSTALLATION SYSTEM AND METHOD

(75) Inventors: W. Kwun-Wing Cheung, Shoreline, WA (US); Mark Cloud, Seattle, WA (US); Christopher L Schwitters, Bothell, WA (US)

(73) Assignee: The Boeing Company, Chicago, IL (US)

( * ) Notice: Subject to any disclaimer, the term of this patent is extended or adjusted under 35 U.S.C. 154(b) by 44 days.

(21) Appl. No.: 13/485,720

(22) Filed: May 31, 2012

(65) Prior Publication Data
US 2013/0320140 A1    Dec. 5, 2013

(51) Int. Cl.
*B64C 1/00* (2006.01)

(52) U.S. Cl.
USPC ........................................................ 244/119

(58) Field of Classification Search
USPC ......... 244/118.5, 119, 121, 131, 132; 52/474, 52/476, 483.1, 489.1, 489.2; 403/326, 403/329; 24/289, 292, 458, 581.11; 248/551
See application file for complete search history.

(56) References Cited

U.S. PATENT DOCUMENTS

| | | | | |
|---|---|---|---|---|
| 1,940,969 A * | 12/1933 | Randall | ............................. | 52/511 |
| 1,942,119 A * | 1/1934 | Place | ............................. | 29/91.1 |
| 1,948,462 A * | 2/1934 | Le Page | ..................... | 24/581.11 |
| 1,965,520 A * | 7/1934 | Boden | ......................... | 24/581.11 |
| 2,070,839 A * | 2/1937 | Place | .............................. | 52/177 |
| 2,925,050 A | 2/1960 | Candlin, Jr. et al. | | |
| 3,752,553 A * | 8/1973 | Bildahl et al. | .............. | 312/265.1 |
| 5,202,172 A * | 4/1993 | Graf | .............................. | 428/100 |
| 5,458,521 A * | 10/1995 | Todd | ............................... | 446/73 |
| 6,224,339 B1 * | 5/2001 | Rhodes et al. | ................ | 416/224 |
| 6,701,678 B1 * | 3/2004 | Skov et al. | ...................... | 52/79.9 |
| 7,527,223 B2 * | 5/2009 | Ebner et al. | .................... | 244/131 |
| 7,658,044 B2 * | 2/2010 | Roth | .......................... | 52/396.04 |
| 2004/0190985 A1 * | 9/2004 | Aigner et al. | ................. | 403/329 |
| 2009/0026318 A1 * | 1/2009 | Gross et al. | .................... | 244/131 |

FOREIGN PATENT DOCUMENTS

| | | |
|---|---|---|
| DE | 3528316 A1 | 1/1987 |
| EP | 0279620 B1 | 6/1993 |
| EP | 0761905 A1 | 3/1997 |
| EP | 1172500 A1 | 1/2002 |
| EP | 1338719 A1 | 8/2003 |
| EP | 1468907 B1 | 7/2008 |

* cited by examiner

*Primary Examiner* — Brian M O'Hara
*Assistant Examiner* — Jessica Wong
(74) *Attorney, Agent, or Firm* — Parsons Behle & Latimer

(57) ABSTRACT

A system for attaching a wall panel includes a wall panel and a lock strip. The wall panel has a back and a tab extending from the back. The lock strip is moveably attached to a wall frame member, and has a three-position locking slot, including a receiving portion configured to receive the tab, a locking portion configured to lock the tab with respect to the frame member, and a release portion configured to release the tab. The wall panel is removably attachable to the frame member by inserting the tab into the receiving portion and linearly moving the lock strip to lock the tab in the locking portion. The system can be used for attaching interior sidewall panels in an aircraft.

20 Claims, 12 Drawing Sheets

WALL INSTALLATION SYSTEM AND METHOD

FIELD

The present disclosure relates to wall installation systems, such as for aircraft interior sidewalls. More particularly, the present disclosure relates to a system and method for installing wall panels that is quick and secure and requires minimal tools, and which also facilitates later removal of wall sections while minimizing damage to the wall structure.

BACKGROUND

The statements in this section merely provide background information related to the present disclosure and may not constitute prior art.

Modern commercial aircraft typically include a fuselage having a series of curved transverse ribs and longitudinal stringers. The exterior of the ribs and stringers are covered with a skin of aluminum, carbon fiber composite or other suitable material. The interior of the aircraft includes a series of curved sidewall panels that are attached to the inside of the ribs, typically by screws or other fasteners. The wall panels are typically of polymer material, and can include window frames and other structure that forms a part of the finished aircraft. Once wiring, insulation and other internal wall components are installed between the ribs and inside the skin, the interior wall panels are attached to cover the insulation and other internal wall components, such as environmental components, with a durable covering that provides a pleasing appearance.

Typical aircraft sidewall panels require specialized tooling and hardware for installation, such as special screws, washers, screw drivers, panel installation support aids, shims, etc. In one common arrangement, a sidewall installation involves eight fasteners that attach to their respective frame mounting brackets. Some sidewall systems include mounting hardware (e.g. screws) that is shared between adjacent panels. Other sidewall systems avoid screws and fasteners by using keyways, slotted brackets and the like.

With all of the elements of a typical sidewall installation, it can be a challenge to get the sidewall properly aligned rotationally, vertically and horizontally and then install all of the fasteners. For example, it is desirable to accurately adjust for the proper sidewall-to-center-of-window alignment, which may involve individually adjusting each one of multiple frame brackets, and centering the sidewall panel to align with the window before final fastening of each mounting screw. Even systems that include keyholes and brackets can involve individual adjustment of multiple brackets during installation. Consequently, typical sidewall installations involve more than one skilled worker and a significant amount of time to properly adjust the sidewall and install all of the fasteners. Adjusting and fastening several parts by hand is time-consuming. The work can present ergonomic an ergonomic environment that is less than desired. Moreover, even after such installations there can be issues with gaps, wrinkles and puckers in the panel, due to internal stresses induced during the installation process and other irregularities.

Typical sidewall installations can also present challenges when removal of panels is desired. Certain aircraft maintenance and repair operations can involve the removal of one or more sidewall panels in an aircraft, in order to allow access to electrical, mechanical and other components inside the wall. With typical fastener-attached wall panels, removal of an existing panel presents a higher than desired chance of damage to the panel (perhaps resulting in costly replacement), and a higher than desired likelihood of misalignment or other defect when the panel is replaced. Panel systems that have shared fasteners between adjacent panels present other possible problems.

The present disclosure is directed toward one or more of the above-mentioned issues.

SUMMARY

In one embodiment, the present disclosure provides a system for attaching a wall panel, including a wall panel, and a lock strip. The wall panel has a back and a tab extending from the back. The lock strip is moveably attached to a wall frame member, and has a three-position locking slot, including a receiving portion configured to receive the tab, a locking portion configured to lock the tab with respect to the frame member, and a release portion configured to release the tab. The wall panel is removably attachable to the frame member by inserting the tab into the receiving portion and linearly moving the lock strip to lock the tab in the locking portion.

In one specific embodiment, the wall panel is an aircraft interior panel, and the frame member is a rib of an aircraft fuselage.

In another specific embodiment, the tab comprises a substantially rigid, upstanding member having a distal bulb end configured to engage the receiving portion of the locking slot in a friction fit.

In another specific embodiment, a spline having a channel is fixedly attached to the frame member, and the lock strip is moveably disposed in the channel.

In another specific embodiment, the wall panel is removable from the frame by linearly moving the lock strip to align the release portion with the tab.

In accordance with another embodiment, the present disclosure provides an aircraft having an airframe and a fuselage with a plurality of substantially parallel frame members, a spline, fixedly attached to the frame members, an interior wall panel, and a lock strip, linearly moveably disposed in the spline. The wall panel has a back, with a plurality of tabs extending from the back. The lock strip has a plurality of three-position locking slots. Each locking slot includes a receiving portion, configured to receive a tab, a locking portion, configured to positionally lock the tab with respect to the frame member, and a release portion, configured to allow removal of the tab from the slot. The wall panel is removably attachable to the frame by inserting the plurality of tabs into the corresponding receiving portions, and linearly moving the lock strip to lock the tabs in the locking portions.

In accordance with yet another embodiment, the present disclosure provides a method for installing a wall panel in an aircraft fuselage interior. The method includes inserting a plurality of tabs extending from a back of a wall panel into receiving portions of three-position moveable lock strips associated with at least two frame members of the fuselage, and linearly pulling the lock strips to align a locking portion of the locking slot of the lock strip with the tabs, thereby fixing the position of the wall panel with respect to the frame members.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

Illustrative embodiments are described below as they might be employed in a wall installation system. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments will become apparent from consideration of the following description and drawings. These embodiments are described in sufficient detail to enable those skilled in the art to practice the invention, and it is to be understood that modifications to the various disclosed embodiments can be made, and other embodiments can be utilized, without departing from the spirit and scope of the present invention. The following detailed description is, therefore, not to be taken in a limiting sense.

Figure 1A:
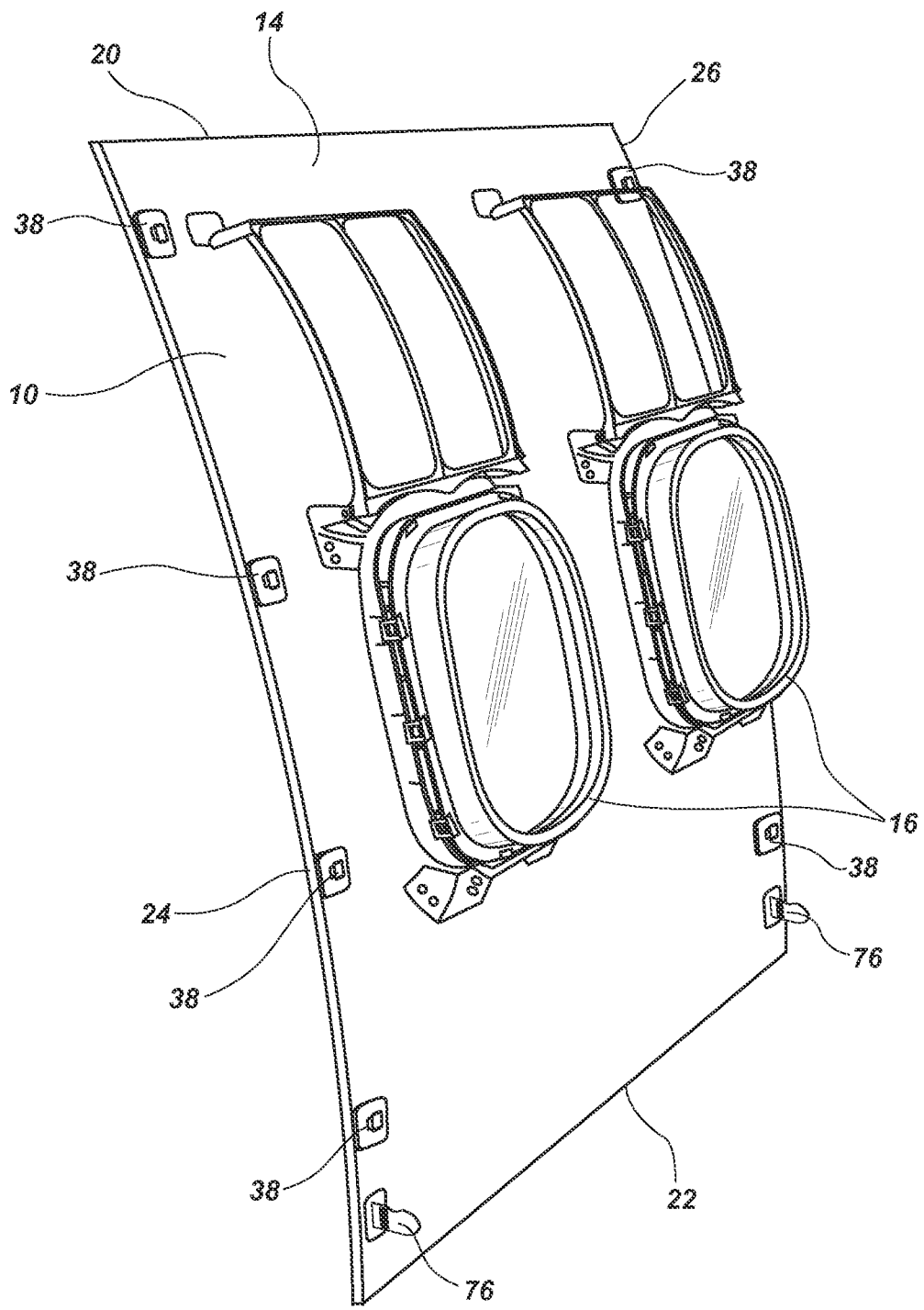
FIG. 1A is a perspective view of the back side of an embodiment of a sidewall panel configured for use in a wall installation system as described herein.
Figure 1B:
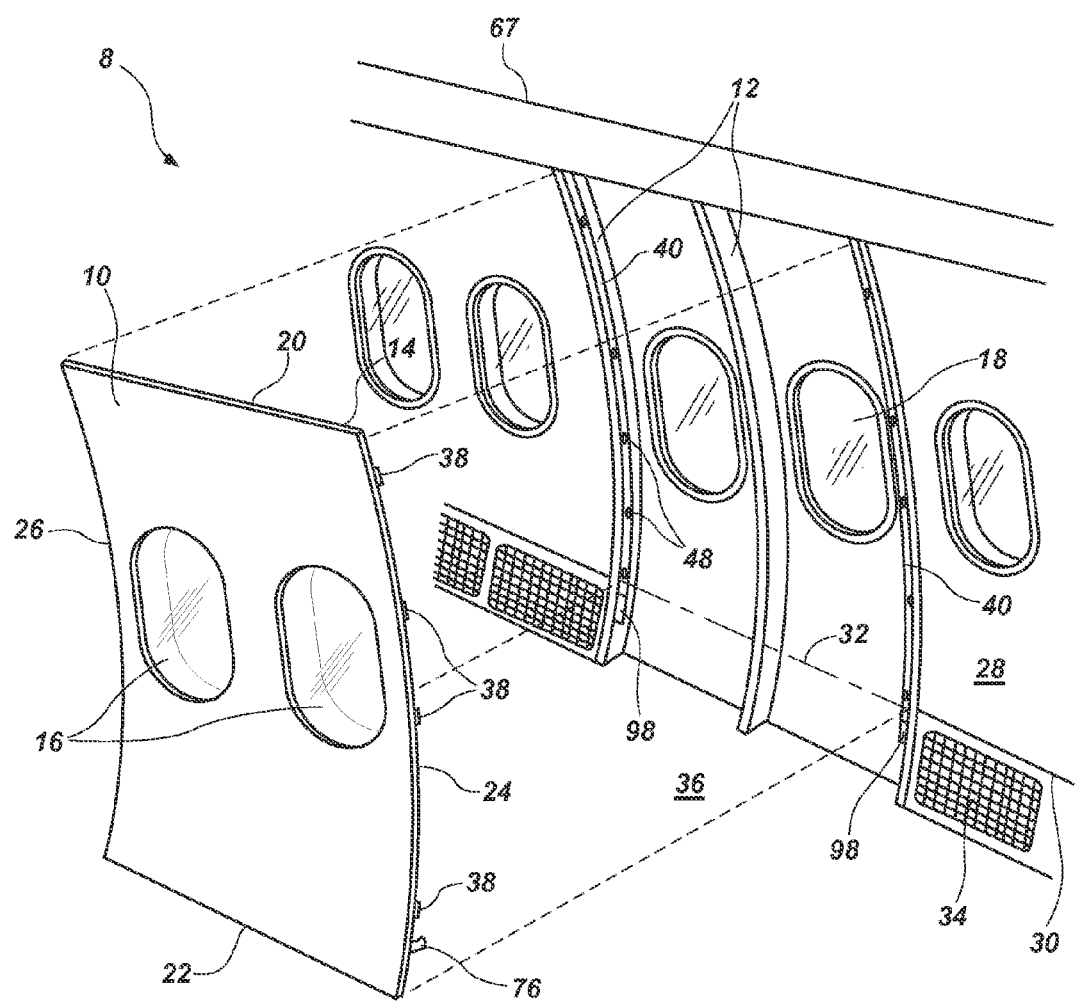
FIG. 1B is a perspective view of an embodiment of a wall installation system showing the sidewall panel of FIG. 1A positioned near an aircraft interior frame.

Shown in FIGS. 1A and 1B is an aircraft sidewall panel 10 that is ready to be installed in the interior of an aircraft. Aircraft sidewall panels are frequently honeycomb core or crush-core polymer panels, though other materials can also be used, such as aluminum, and it is to be understood that the system disclosed herein is not limited to these materials. Viewing FIG. 1A, this sidewall panel embodiment includes a back surface 14, to which window frames 16 are attached and positioned to align with exterior structural windows 18 in the outer skin of the aircraft. The sidewall panel 10 has a top edge 20, a bottom edge 22, a right edge 24, and a left edge 26 (though these edges appear reversed in the rear view of FIG. 1A). Adjacent sidewall panels 28 are also visible in FIG. 1B. The bottom edge 22 of the wall panel and the bottom edges 30 of the adjacent wall panels are intended to generally align along line 32, which can be parallel with what is called the water line of the aircraft.

In the embodiment shown in FIG. 1B, below the water line 32 are a series of ventilation panels 34, which extend from the water line down to the aircraft cabin floor 36, and are part of the aircraft ventilation system. These lower panels are sometimes referred to as decompression air grills, and in one embodiment extend about 15" above the floor. These can be installed after the respective sidewall panels above them are installed, as discussed in more detail below.

Extending from the back 14 of the sidewall panel 10 are a plurality of tabs 38. These tabs are configured to interlock with a spline structure 40 that is attached to the frame 12 as part of the wall installation system 8 described herein.

Shown in FIG. 1B is a perspective view of an embodiment of a sidewall installation system 8. This figure shows the aircraft interior sidewall panel 10 positioned near an aircraft interior frame having multiple parallel frame members 12. In this embodiment the frame members 12 are generally upright, curved ribs of an aircraft fuselage, with a wall installation spline 40 attached to at least some of the frame members. It is to be understood that the wall installation system 8 and method disclosed herein can be used with frame members that are curved or straight, and with frame members that are vertical, horizontal, or at any other angle. Where the frame members 12 are curved, the curvature of the wall panel 10 can generally match the curvature of the frame members, though the system and method disclosed herein can apply to wall panels that are not curved. In an aircraft application, the frame members 12 are likely to be of aluminum or composite material (e.g. reinforced carbon fiber). However the wall installation system 8 disclosed herein is useful with frame members of many other materials, such as metal, polymer or composite, wood, etc.

Figure 2:
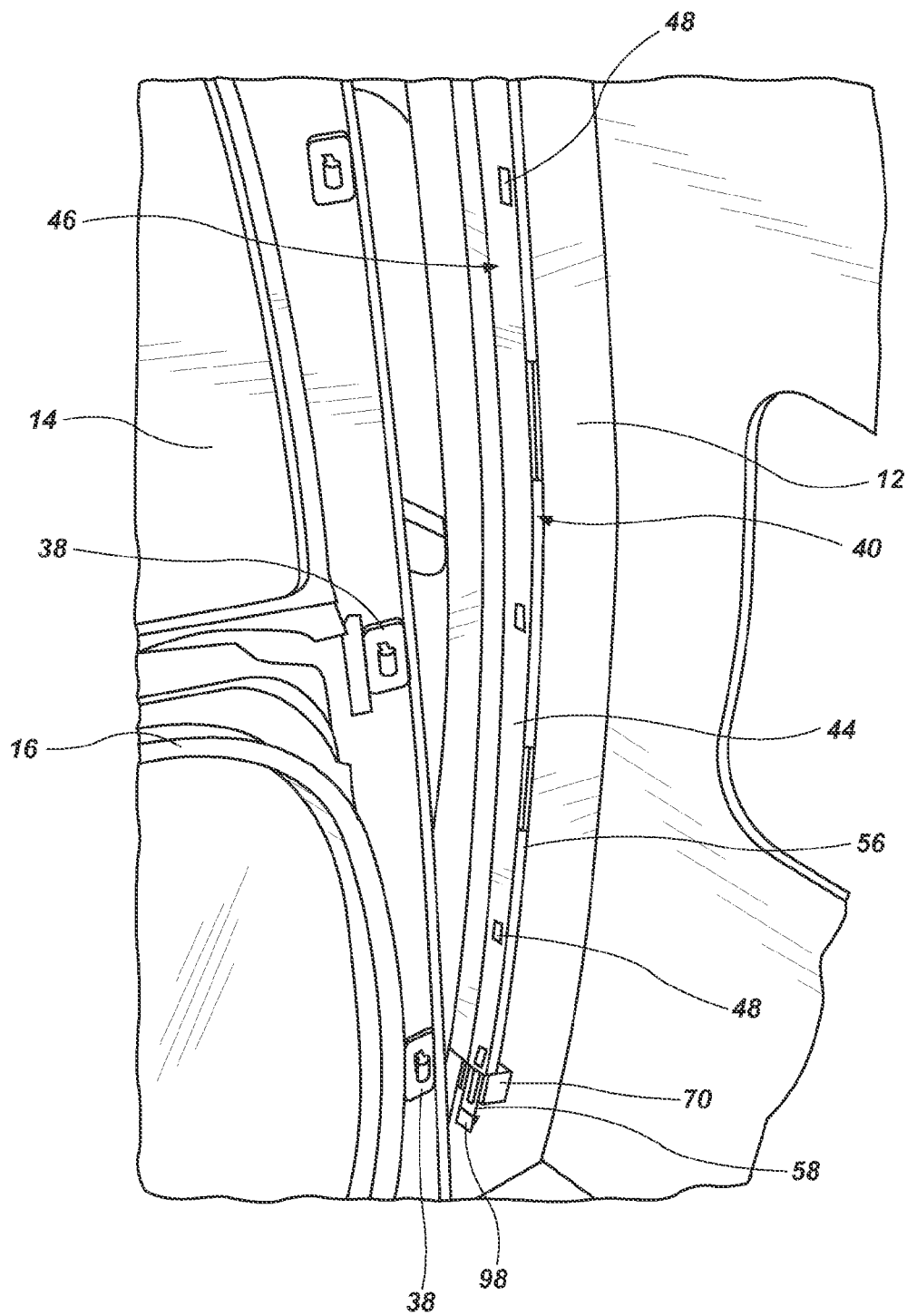
FIG. 2 is a close-up perspective view of an aircraft interior frame member of FIG. 1, with a wall installation spline attached thereto.

Viewing FIG. 2, some of the tabs 38 are visible in more detail. The tabs can be of strong, resilient polymer material, such as Ultem® (polyetherimide) or PEEK (polyetheretherketone). Other materials can also be used. Visible in FIGS. 1B and 2 is the wall installation spline 40 that is attached to the frame members 12. The spline 40 includes a plurality of insert slots 48 for receiving the tabs 38 of the wall panel 10, and a pull tab 98 for locking the tabs to the spline and thus to the frame 12. A lower index retainer 70 is also attached to the frame 12 below the bottom end of the spline 40, and is discussed in more detail below.

Figure 3:
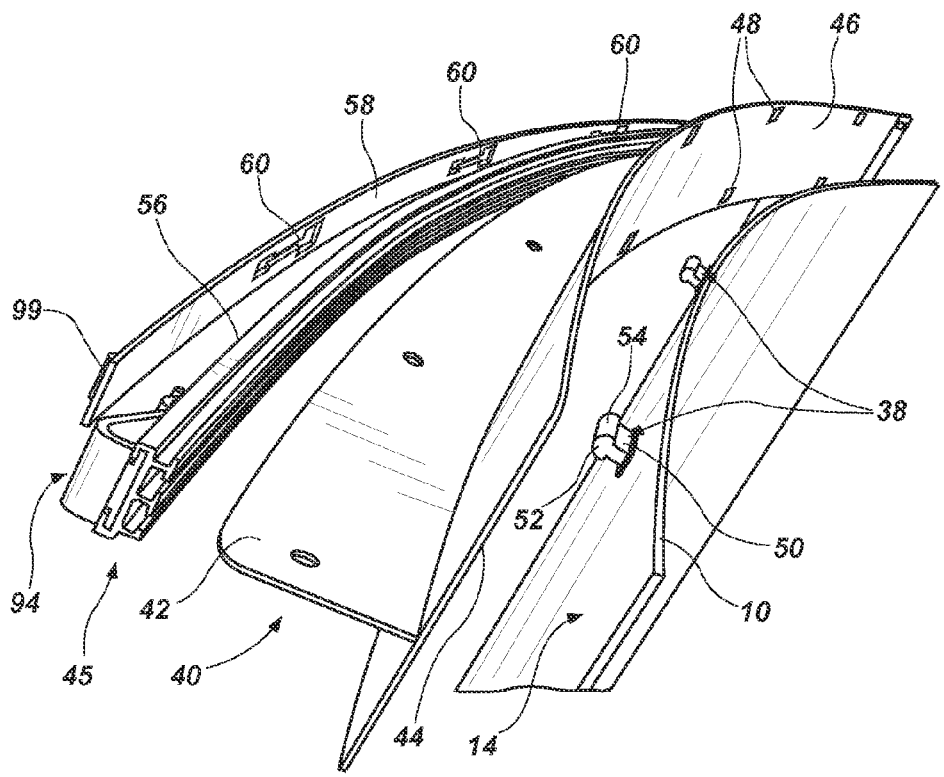
FIG. 3 is an exploded perspective view of an embodiment of a wall installation system as disclosed herein.

An exploded perspective view of this embodiment of a wall installation system 8 is provided in FIG. 3. The view of FIG. 3 is looking down at the top 45 of the channel 56 and spline 40. In the embodiment shown in FIGS. 2 and 3, the spline 40 is a "T" section structural member having a web 42 and a flange 44. The web of the spline is fixedly attachable to the frame member 12, such as via production shock mounts (not shown) located near the top end 45 and bottom end (47 in FIGS. 5 and 6) of the spline 40, supporting the structural spline like a bridge. Shock mounts are well known in the aircraft industry, and those of skill in the art will be able to select and use suitable shock mounts to attach the spline 40 to the aircraft frame member 12. In other embodiments, the spline 40 can be attached to the frame 12 at more than two connection locations. Different numbers of connectors can also be used. Using only two connectors helps to reduce the transmission of mechanical noise energy and vibration to the spline by virtue of having fewer mechanical connection points through which vibration can be transmitted, and also reduces weight (since there are fewer connectors), installation time, and the part count of the installation. Alternatively, more connectors can increase the strength of the connection. As with the tabs 38, the spline 40 can be of polymer material, such as Ultem® or PEEK, or it can be of metal, such as aluminum.

As shown in FIG. 3, the interior face 46 of the flange 44 of the spline 40 includes two series' of insert slots 48 on opposing flanges 44, which correspond to positions of tabs 38 on two adjacent wall panels 10, to allow passage of each tab 38 into a respective locking slot, as discussed below. This allows two adjacent wall panels to attach to a single spline. The tabs 38 are substantially rigid, upstanding members with a distal bulb end 54 configured to engage the receiving portion of a locking slot in a friction or snap-in fit, as discussed below. The tabs 38 generally include a base 50, which is attached to the wall panel 10 (e.g. via adhesive or other attachment method), an upright stem 52 that extends generally perpendicularly from the base 50, and a distal bulb portion 54, that is intended to pass through a respective insert slot 48 and into a locking slot of a lock strip, as described below. A variety of configurations for the tabs 38 have been considered and tested, and the wall installation system 8 disclosed herein is not limited to the configuration shown in the drawings. For example, tabs having a bulb top 54 with a gap or slot (not shown) for providing spring-like performance upon insertion have been tested. Other configurations can also be used.

Figure 10:
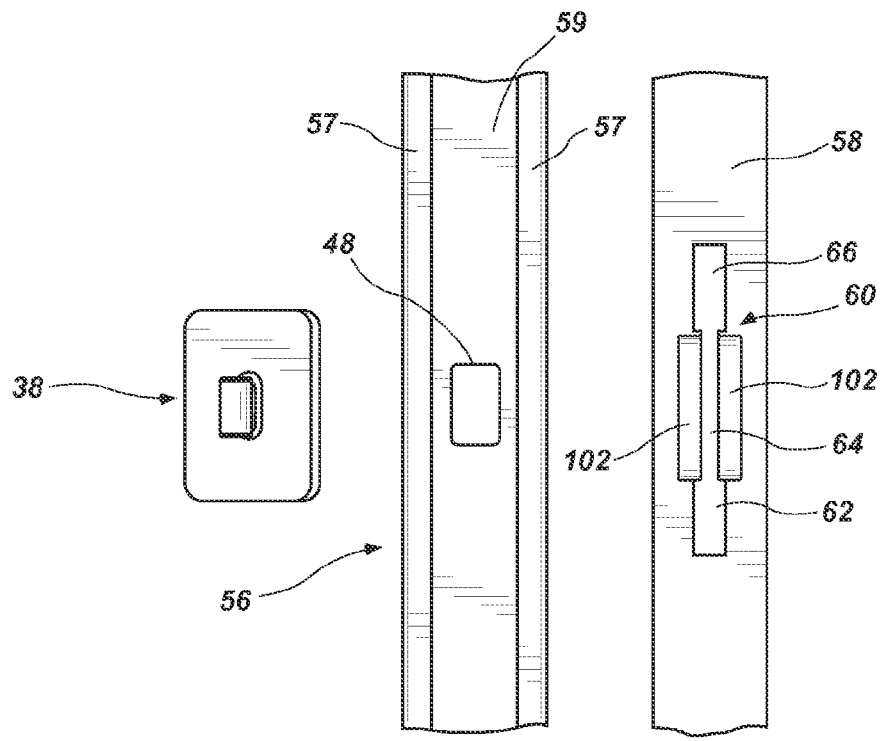
FIG. 10 is an exploded view of a spline track, lock strip and wall panel tab in accordance with an embodiment of a wall installation system as disclosed herein.
Figure 11:
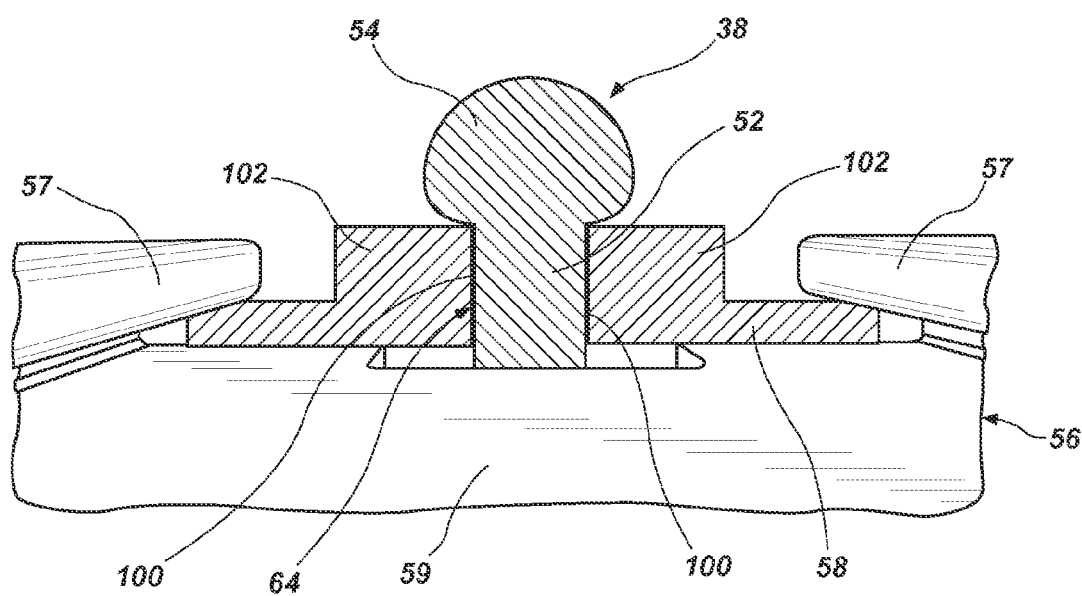
FIG. 11 is a close-up, perspective and partial cross-sectional view of a wall panel tab locked within the locking portion of a lock strip of an embodiment of a wall installation system as disclosed herein.
Figure 16:
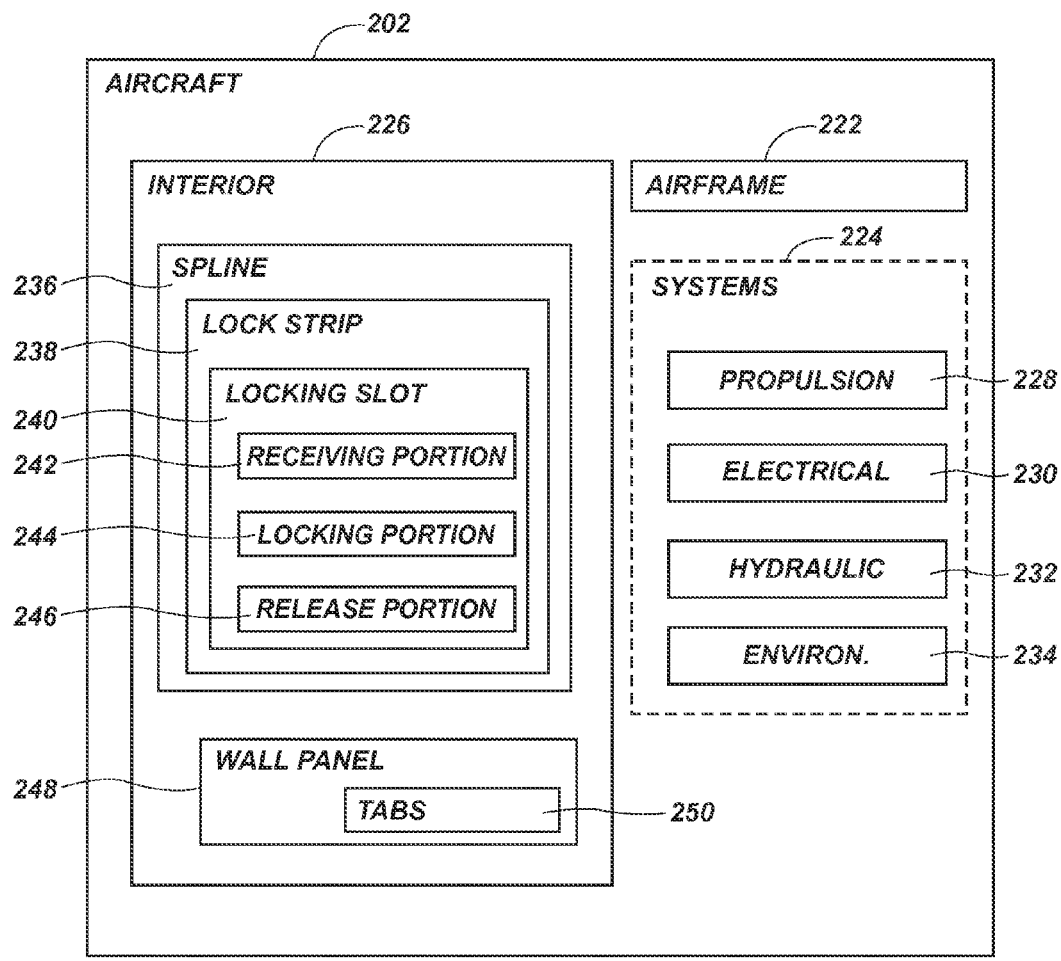
FIG. 16 is a block diagram of an aircraft.

Disposed on the back of the flange 44 (i.e. the side away from the interior of the aircraft, 202 in FIG. 16) of the spline 40 is a channel member 56. As shown most clearly in FIGS. 10 and 11, the channel member 56 includes sidewalls 57 that wrap around a linear central channel floor 59. The channel 56 is configured to hold a lock strip 58 that can linearly slide on the floor 59 within the channel 56 for locking and unlocking the tabs 38 of the wall panel 10, as described in more detail below. The channel 56 can be of metal (e.g. aluminum), composite material, or polymer material, such as Ultem® or PEEK. It is to be understood that FIG. 3 is an exploded view, and shows the channel 56 separated from the spline 40, and the lock strip 58 outside of the channel 56, though in actual use these elements will be connected and operate together.

Figure 5:
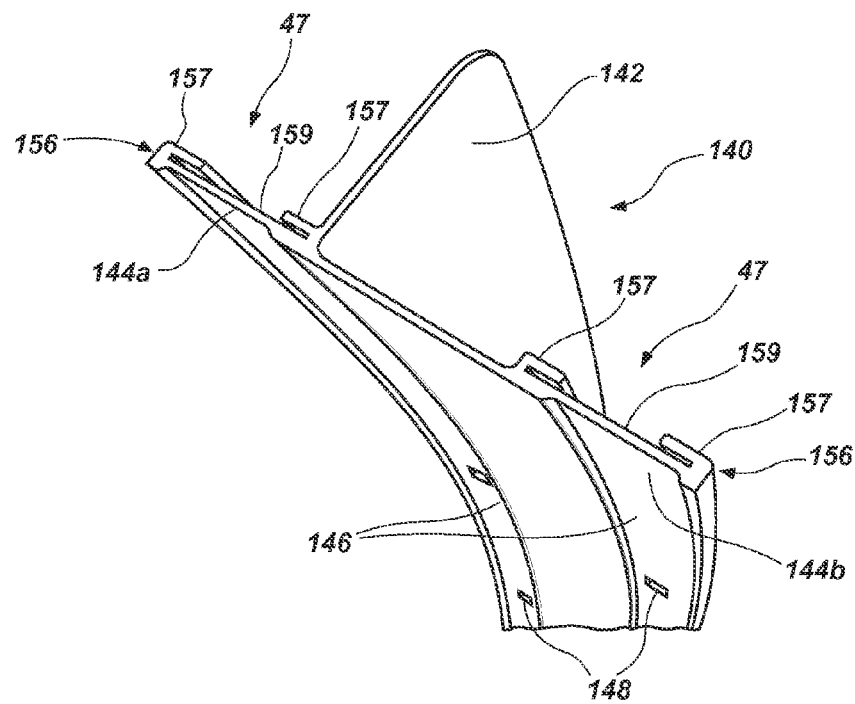
FIG. 5 is a perspective view of an end of another embodiment of an attachment spline for a wall installation system as disclosed herein.

The channel 56 can be a separate member that is fixedly attached to the spline 40, as shown in FIG. 3. Alternatively, the channel 56 can be integrally formed as part of the spline 40. An embodiment of a spline 140 having an integrally formed channel 156 is shown in FIG. 5. As shown in the other spline embodiment described above, the spline 140 is a "T" section structural member having a web 142 and a pair of flanges 144a, b. The web 142 of the spline is designed to be fixedly attached to the frame member 12 of the aircraft, such as by production shock mounts, as discussed above. The back side of each flange 144 includes an integral channel 156 for carrying a lock strip, as discussed above. The central floor 159 of the channel 156 has side walls 157 that are configured to wrap around and hold the edges of the lock strip 58, allowing it to linearly slide within the channel 156 for locking and unlocking the tabs 38 of the wall panel 10, as described in more detail below. The interior face 146 of each of the flanges 144 of the spline 140 includes a series of insert slots 148 that correspond to positions of locking slots in the lock strip 58 for each channel 156, to allow locking tabs 38 from two adjacent wall panels 10 to insert into the respective slots for locking, as discussed below. As with the other embodiment discussed above, the spline 140 with the integral channel 156 can be of polymer, metal, or other suitable materials.

Referring to FIG. 3, the lock strip 58 has a plurality of three-position locking slots 60. Each locking slot 60 is positioned to generally align with one of the insert slots 48 of the spline, as discussed above. The locking slot 60 has three different sections or portions that vary in width, and is configured to receive the tabs 38 that are mounted on the back side of the sidewall panels. In one embodiment, the lock strip 58 is of 4-6 ply fiberglass phenolic material, which is tough and resilient, and interlocks well with the polymer tabs 38. Other materials can also be used.

Various views of the channel 56 and lock strip 58 are shown in FIGS. 10-14. The lock strip 58 is linearly moveable in the channel 56, as indicated by double arrow 61 in FIGS. 6, 7B, 9 and 12-14. Each locking slot 60 includes a receiving portion 62 which is the lowest portion of the locking slot 60, a locking portion 64 in the middle, and a release portion 66 at the upper end of the locking slot. The locking portion 64 is the narrowest, while the release portion 66 is the widest, and the receiving portion 62 is between the two with respect to width.

The receiving portion 62 is configured to receive the tab 38 in a friction fit or "snap" fit. Both the tabs 38 and the lock strip 58 can be of resilient polymer material, which is somewhat flexible and pliable. Other materials can also be used. The receiving portion 62 has a width that is slightly narrower than the distal bulb 54 of the tab 38. This allows the distal bulb 54 to be pushed into the receiving portion 62 in a press fit that can hold the wall panel 10 in rough position, before it is locked into place. This allows the position of the wall panel 10 to be adjusted slightly after it is initially attached to the wall frame members 12. The channel 56 can be slightly wider than the lock strip 58 (e.g. by about 0.125"), so that the lock strip not only slides up and down in the channel 56, but is also allowed to flow side to side a small amount within the central floor 59 of the channel. The amount of lateral play allowed between the side walls 57 of the channel and the lock strip 58 can be adjusted to provide more adjustability of the lock strip position, if desired. Consequently, slight up-down and fore-aft adjustment of the position of the tabs 38 (and hence of the wall panel 10) is possible after the tab 38 is inserted into the receiving portion 62. This allows the sidewall 10 to be snapped in, holding it in place without being fully constrained, so that the sidewall 10 can be adjusted to align with adjacent structure (e.g. window structure 18 in FIG. 1B, adjacent sidewall panels 28 in FIG. 1B, etc.). As described below, the lock strip 58 is then pulled down to a locked position (shown in FIGS. 6, 7A-B and 13) once sidewall alignment has been achieved.

Figure 14:
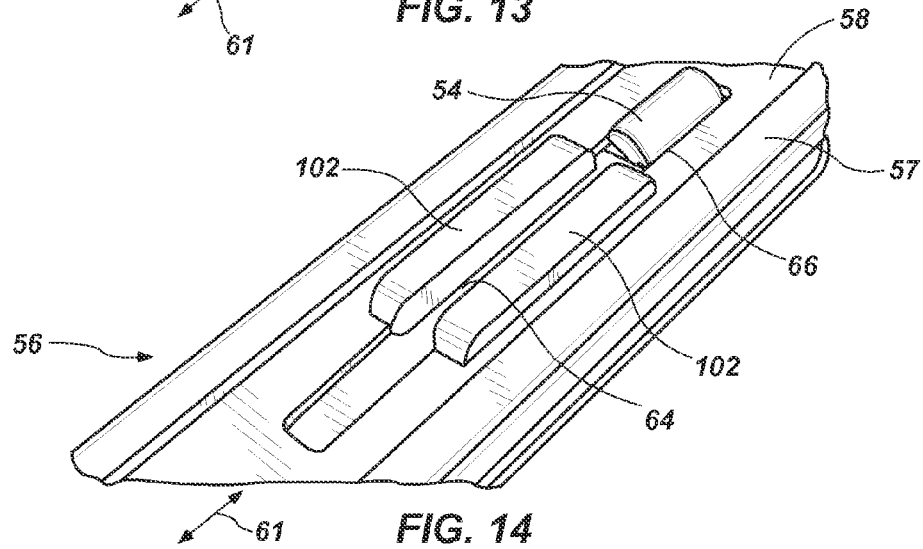
FIG. 14 is a rear perspective view of a tab inserted into the release portion of a lock strip of an embodiment of a wall installation system as disclosed herein.

The press-fit configuration of the tabs 38 and the receiving portion 62 allows any of the tabs 38 to be pulled back out of their respective receiving portions 62 if desired, such as for repositioning of the wall panel, etc., without damaging the wall panel, tabs or splines 40. However, the tabs are more easily removed if the lock strip 58 is pulled to its release position, as shown in FIG. 14 and described below. The size and configuration of the tabs 38 and bulbs 54 with respect to the receiving portions 62 are selected to make insertion easy, but extraction not as easy. This helps prevent the wall panel 10 from falling away from the frame 12 after initial insertion of the tabs 38. This feature is provided in part by the configuration of the lock strip 58 and the channel 56. When a tab 38 is inserted into the receiving portion 62, the force pushing the tab can temporarily deform the lock strip 58 away from the channel (since the lock strip is flexible), thus allowing the rounded distal surface of the bulb 54 of the tab 38 to deform the receiving portion 62 and allow entrance of the tab. However, once the tab enters the receiving portion 62 and the lock strip 58 has snapped back to its undeformed configuration, the back side of the bulb 54 (which is not as rounded as the distal end of the bulb) is not as capable of deforming and pushing back through the receiving portion 62. Moreover, the lock strip is directly supported against force in the opposite direction by the floor 59 of the channel 56, and by the spline 40. This dramatically reduces the degree of flexibility of the lock strip, 58 making it more difficult to remove a tab 38 from the receiving portion 62 than it is to insert the tab in the first place.

Figure 4:
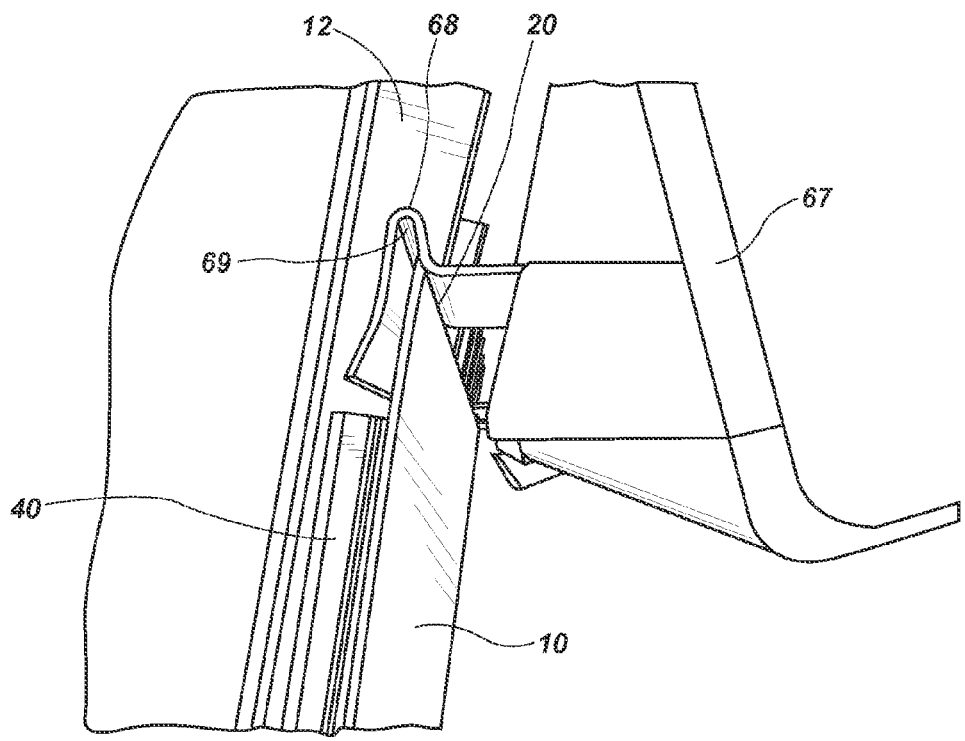
FIG. 4 is a perspective view of an upper alignment tab for attachment of a wall panel in accordance with an embodiment of a wall installation system as disclosed herein.

When attaching a wall panel 10 to the frame members 12, the top edge 20 of the panel can first be inserted into structure for aligning the top edge 20 of the panel 10, before snapping the tabs 38 into the receiving portions 62. Shown in FIG. 4 is a perspective view of an embodiment of an upper alignment device 68 for receiving the top edge 20 of a wall panel 10. The upper alignment device 68 can be a separate channel device attached to the frame 12, or it can be, for example, a strong back of an overhead stowage bin 67, which can include an elongate slot 69 that is configured to perform the same function. One upper alignment device 68 can be shared to receive the top edges 20 of two or more adjacent sidewall panels 10. Indeed, a substantially continuous upper alignment device 68 can extend for a long distance between a row of overhead storage bins 67 and the adjacent side frame structure 12 of an aircraft, providing an alignment reference for a series of adjacent wall panels 10.

The snap-in retaining feature of the receiving portion 62 of the lock strip 58 does not merely perform a snap-in and snap-out function. Snap-in and snap-out devices can tend to break or become damaged with even limited usage, and the likelihood of damage increases depending on the strength of the fit. For an aircraft sidewall application, it is desirable that a snap-in and snap-out device have strength comparable to a traditional screw fastener. This is difficult to achieve without producing a configuration that is highly susceptible to damage.

The snap-in attachment system disclosed herein provides easy engagement of the panel 10 to its mating part—the locking slot 60. Because the lock strip 58 is linearly slidable, the locking slot 60 is not stationary, and moves when the lock strip 58 is pulled down (or pushed up, as discussed below) as indicated by arrow 61. When a worker begins installation of a wall panel 10, the worker can first get the top two tabs 38 (e.g. one at upper left and one at upper right of the panel 10) to snap into their respective receiving portions 62. This becomes a primary installation index. This initial engagement will keep the sidewall panel loosely attached (i.e. hanging in place) on the spline 40, and thereby upon the frame members 12. The rest of the tabs 38 can then be blind-pushed into their corresponding receiving portions 62 without interference. In this way, all tabs 38 of a given wall panel 10 can be snapped into their respective locking slots 60 and initially kept in place, before they are locked. In one embodiment, there are eight snap-in tabs 38 per sidewall panel 10, though other numbers of tabs can be used. Under non-locking status, the sidewall panel 10 is allowed to have a level of adjustment for window alignment. With all attachments set, adjusting window alignment or other alignment aspects of the panel is greatly simplified.

When a worker slides the top edge 20 of the sidewall panel 10 up into the upper alignment device 68 during installation, the top edge 20 of the panel will be caught in place, and stopped from further advancement or moving upward. This guides the installer to place the sidewall 10 in an appropriate position before the next step. At this point, the sidewall 10 can be moved or adjusted, as desired, to find access for the top left and right tabs 38 to snap into their receiving portions 62, as discussed above. Once engaged, the upper alignment device 68 becomes a retainer, keeping the top edge 20 of the sidewall from moving inboard or outboard.

Figure 6:
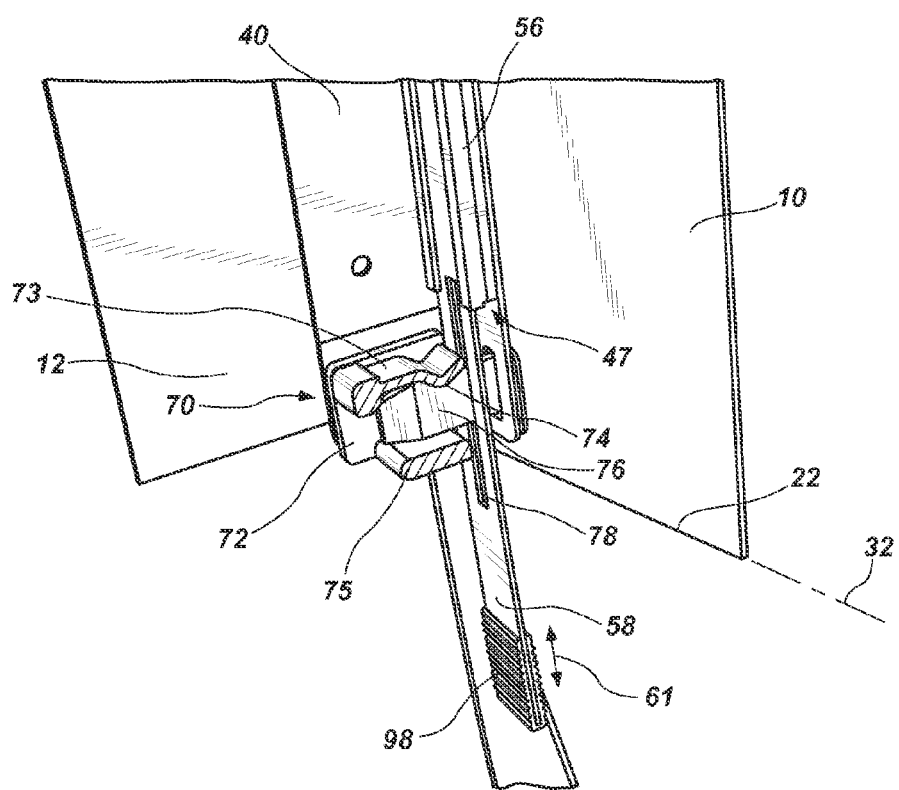
FIG. 6 is a perspective, partial sectional view of an embodiment of a lower index retainer assembly and wall panel in accordance with an embodiment of a wall installation system as disclosed herein.

Initial attachment and alignment of a wall panel 10 is also facilitated by a lower index retainer assembly (70 in FIGS. 2, 6, 80 in FIGS. 7A, B) associated with the lower end of the panel 10. The lower index retainer assembly essentially provides a pin connection at the lower left and right sides of the panel 10 for facilitating initial placement of the panel. A perspective/sectional view of an embodiment of a lower index retainer assembly 70 is shown in FIG. 6, and two views of another embodiment of a lower index retainer assembly 80 are provided in FIGS. 7 and 8. The lower index retainer functions to set the bottom edge 22 of the sidewall 10 at the designated water line level (32 in FIGS. 1B and 6) during initial wall placement, so as to give a general right height and position of the panel 10, and to help provide an initial attachment of the wall before the lock strip 58 is locked.

Figure 8A:
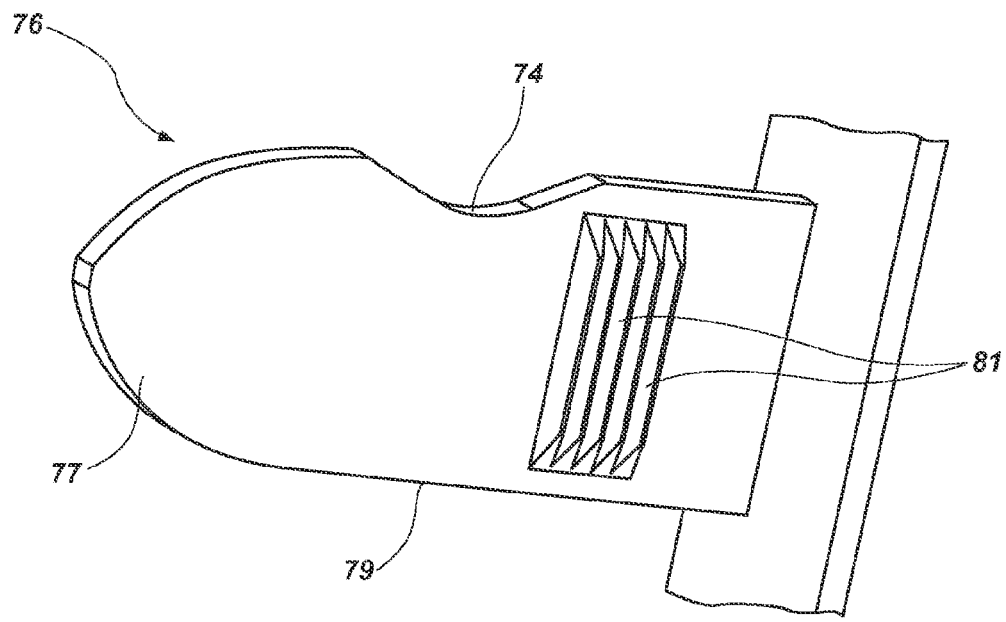
FIG. 8A is a close-up view of an embodiment of a snap-in wedge.

The first type of lower index retainer 70, shown in FIG. 6, includes a retainer clip 72, which is attached to the air frame 12, such as via a production shock mount. A snap-in wedge 76 is attached to the wall panel 10. As shown in FIG. 1A, an individual wall panel 10 can have two snap-in wedges attached near the bottom edge 22. The lock strip 58, channel 56 and spline 40 of the wall attachment system 8 are also visible in the view of FIG. 6. The lower index retainer assembly 70 is a passive, one-piece retainer device that is configured to capture the snap-in wedge 76 from the lower region of the sidewall panel 10. In this assembly, the lock strip 58 includes a vertical slot 78 that allows the snap-in wedge 76 to pass through the lock strip to reach the retainer clip 72. A close-up view of one embodiment of a snap-in wedge 76 is shown in FIG. 8A. The snap in wedge 76 generally includes a pointed distal end 77, a bottom edge 79, and an upper slot 74. Viewing FIG. 6, the retainer clip 72 includes a resilient upper clip member 73, which snaps into the upper slot 74 of the wedge 76 when the wedge is inserted into the clip. The clip 72 also includes a lower support shelf 75, which supports the bottom 79 of the wedge 76, thereby supporting the wall panel 10 when the wedge is inserted.

When the wedge 76 is inserted into the clip 72, vertical, fore and aft and other adjustments of the wall panel are still possible, though the panel 10 is supported substantially at the waterline level 32. As with the tabs 38, discussed above, once the wedge 76 is initially engaged in the retainer clip 72, but before pulling the lock strip 58 to lock the system, the sidewall 10 is not completely constrained. It is allowed to move around within slightly to allow window alignment. With this type of lower index retainer 70, removing the wedge 76 from the retainer clip 72 simply requires pulling on the bottom 22 of the wall panel 10 to withdraw the wedge 76 from the clip 72, after the lock strip 58 is released, as discussed below.

Figure 7A:
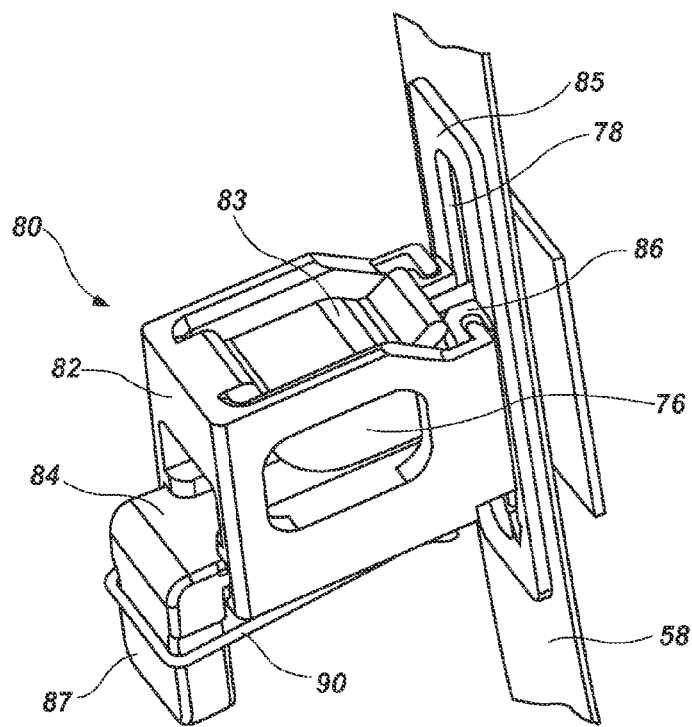
FIG. 7A is a perspective view of another embodiment of a lower index retainer assembly in accordance with an embodiment of a wall installation system as disclosed herein.
Figure 7B:
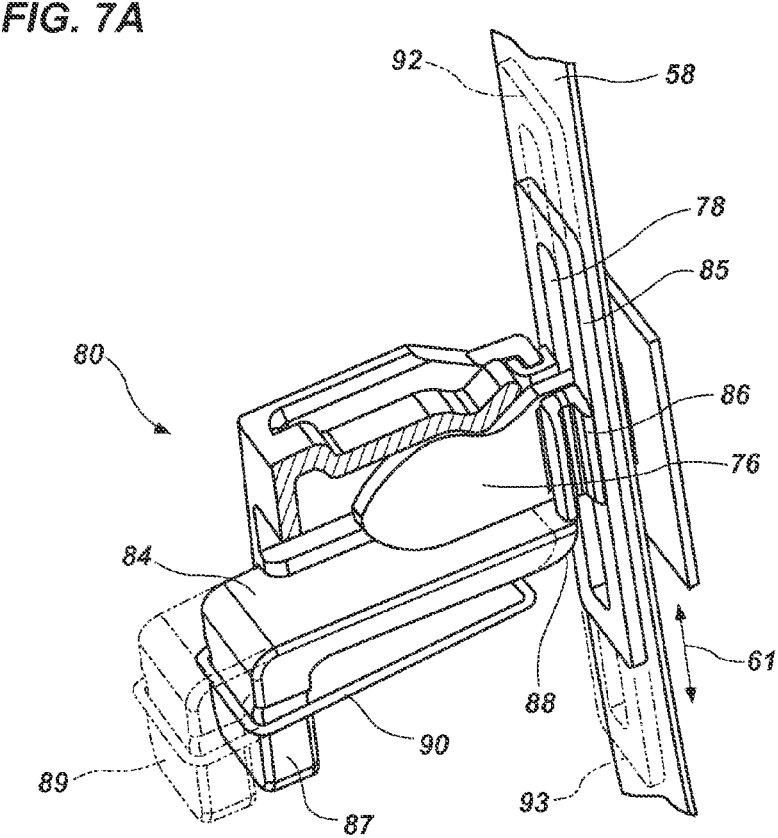
FIG. 7B is a partially sectional, perspective view of the lower index retainer assembly of FIG. 7A.
Figure 8B:
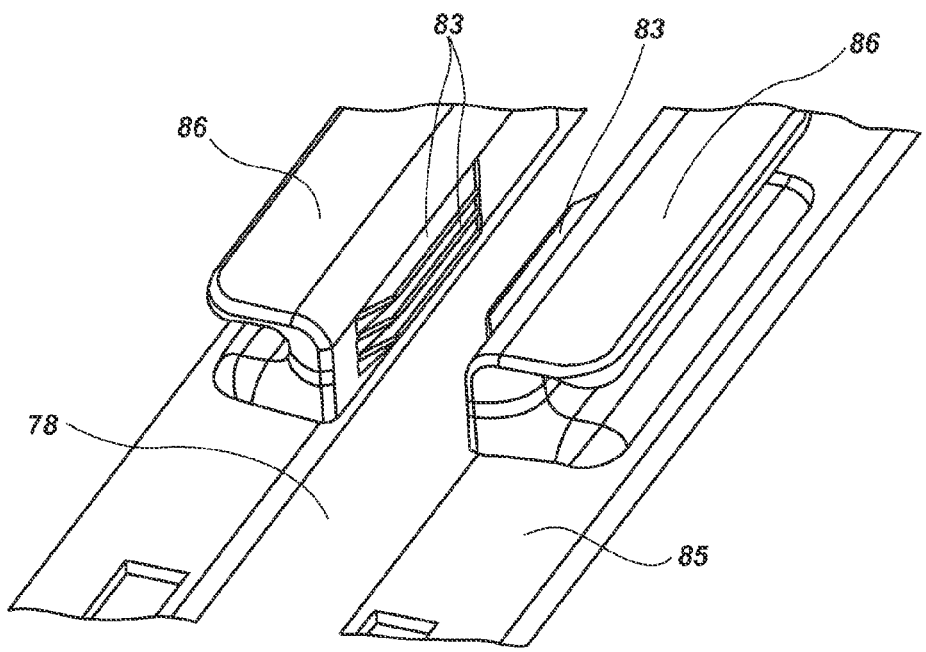
FIG. 8B is a close-up perspective view of an embodiment of the bumpers of the lock strip slot frame.

A second type of lower index retainer assembly 80 is shown in FIGS. 7A and 7B. It is to be understood that the lower index retainer configurations of either FIG. 6 or FIGS. 7A-B can be used with the wall panel attachment system 8 shown and described herein. Other configurations can also be used. The embodiment shown in FIGS. 7A and 7B includes an index retainer body 82 that is designed to be attached to the airframe 12 below the bottom edge of the spline (40 in FIG. 6), at a similar position and orientation as the lower index retainer embodiment 72 shown in FIG. 6 and discussed above. The index retainer body 82 includes a forward slot for receiving the snap-in wedge 76, an upper clip member 83 that interlocks with the wedge 76, in the manner discussed above, and a spring-loaded slide block 84 disposed below the snap-in wedge 76. As with the configuration shown in FIG. 6 and discussed above, in the embodiment of FIGS. 7A and 7B the lock strip 58 includes a slot 78 for allowing passage of the wedge 76, and also includes a slot frame 85 having slot edge bumpers 86 that extend outward from the slot frame 85. A close-up view of these bumpers is shown in FIG. 7B. The bumpers 86 are positioned alongside the central extent of the slot 78, and are designed to contact the top surface of the slide block 84 when the lock strip 58 is at the locking position. This stops the lock strip 58 from moving further down, keeping it at full locking position, but without going beyond that position.

The snap-in wedge 76 and the slot edge bumpers 86 can also be configured to provide additional interlocking structure to hold the wall panel in place. As shown in FIG. 7A, the body of the snap-in wedge 76 can include vertical ridges 81. While only one side of the snap-in wedge 76 is shown in FIG. 7A, similar ridges can be provided on the opposite side, also. These ridges 81 can be configured to interlock with similar vertical ridges 83 that are provided on the interior faces of the lock strip slot edge frame bumpers 86, as shown in FIG. 7B. When the lock strip 58 is pulled down to the locking position, as shown in FIG. 7A, the ridges 83 on the inside of the bumpers 86 will intermesh with the ridges 81 on the outside of the snap-in wedge 76, thus providing additional locking force to hold the wall panel 10 in place. The snap-in wedges 76 and bumpers 86, with the ridges 81 and 83, can thus be viewed as a slightly different and larger version of the interlocking tabs 38 and their associated locking structure. These elements provide structure that completes the fastening of the lower portion of the wall panel 10 to the spline 40 and thus to the frame 12.

The slide block 84 also includes a downwardly extending release tab 87 at its rear extremity, and a sloped surface 88 on the underside of its forward end. The release tab 87 is used to push the slide block back, away from the lock strip 58, thereby withdrawing the forward portion of the slide block from contacting the bumpers 86, thereby allowing the lock strip 58 to be drawn downward for releasing the wall panel 10, in the manner discussed below. The backwardly extended position of the slide block 84 is shown in dashed lines at 89 in FIG. 7B. Biasing of the slide block toward the forward locking position can be accomplished with a spring element 90, which can be metal, polymer or other suitable material, and can be configured in various ways. The sloped bottom surface 88 of the slide block 84 provides a wedge surface to allow the bumper 86 to push the slide block aside (against the biasing force upon the slide block) when the lock strip 58 is pushed upwardly, similar to the way a door latch is naturally pushed aside when the angled and/or curved latch face contacts a strike plate when a door is closed.

As shown in FIG. 7B, the length of the slot 78 allows the lock strip 58 to be in an upper position, shown in dashed lines at 92, when the snap-in wedge 76 is first inserted. This position can correspond to the alignment of the receiving portions 62 with the spline insert slots 48 for initial insertion of the tabs 38 (see FIG. 12). The lock strip 58 will be in the position shown in FIG. 7B when the lock strip is pulled downward to the locking position, which can correspond to the lock strip 58 having the locking portion 64 aligned with the tabs 38 to lock the wall panel 10 in place (see FIG. 13).

Finally, the lock strip 58 can be pulled to the fully down release position, shown at 93 in FIG. 7B, after the slide block 84 is withdrawn, to align the release portion 66 with the spline insert slot 48 and allow removal of the tabs 38 and the wall panel 10 (see FIG. 14). Contact of the top inside surface of the slot 78 with the top edge of the snap-in wedge 76 can serve to define the maximum downward extent of travel of the lock strip. In this way, the lower index retainer 80 and the lock strip 58 with the slot frame 85 and bumpers 86 create a mechanical stop for the locking position of the lock strip through contact of the bumpers 86 with the slide block 84, and the extent of the slot 78 and position of the snap-in wedge 76 define the release position of the lock strip.

Figure 9:
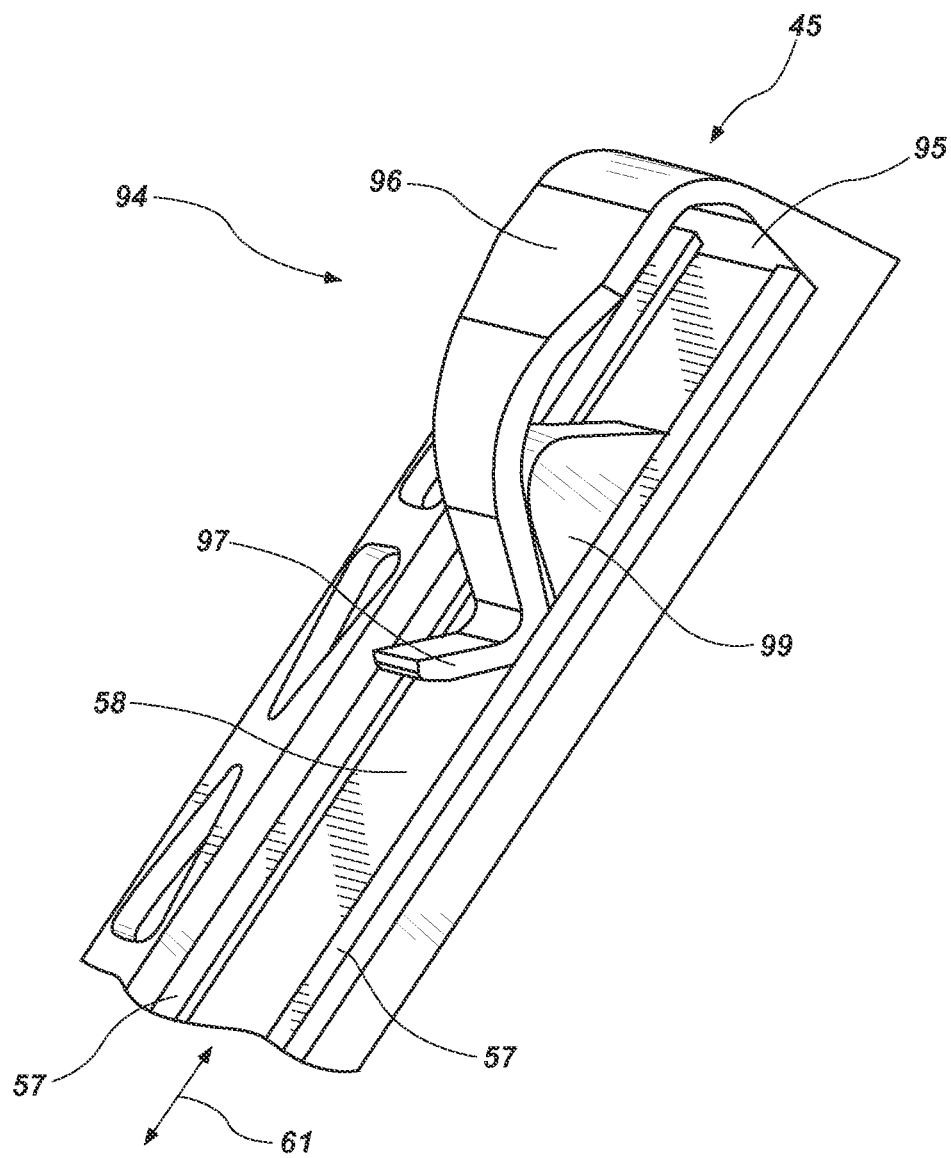
FIG. 9 is a perspective view of an embodiment of a reset stop positioned at the top of the lock strip channel of the spline.

It will be apparent that there is no structure shown in FIGS. 7A and 7B that governs or restricts the upper position (shown at 92 in FIG. 7B) of the lower lock strip slot 78 when there is no snap-in wedge 76 inserted through that slot and received in the lower index retainer 80. As shown in FIG. 9, which shows the top end 45 of the channel 56, this upper position can be governed by a reset stop 94 positioned at the top of the lock strip channel 56. The reset stop 94 in this embodiment includes an end wall 95 and a stop tab 96 that is biased downward to contact or nearly contact (e.g. 0.03" above) the floor 59 of the channel 56. The stop tab 96 includes a tab face 97 that is positioned to contact and receive a boss or ridge 99 on the upper end of the lock strip 58 when it is pushed to this upper position. After the lock strip 58 has been pulled down to the release position and the panel 10 removed, the lock strip 58 can then be pushed fully upward to the reset position, at which point the top edge of lock strip 58 will bump against face 95 and stop. During this upward movement, the ridge 99 of the lock strip 58 will contact the tab face 97 and push the stop tab 96 upward, allowing the ridge 99 to pass under and beyond the tab and then be held in place by the tab 96 as it springs back to its biased position, as shown in FIG. 9. In this position the receiving portions 62 of the lock strip 58 will again be aligned with the insert slots 48 of the spline 40, ready for insertion of the tabs 38.

Initial engagement of the sidewall 10 occurs when the receiving portions 62 of the lock strip 58 are aligned with the spline insert slots 48, the top tabs 38, are snapped into their respective receiving portions 62. In this position the tops tabs 38 act like a pilot attachment. The remaining tabs 38 will then be self-aligned and can be pushed to snap into their respective insert slots 48. The low profile snap-in wedges 76 can then be snapped into the associated lower index retainers 70, 80. At this point, the sidewall panel 10 is generally held in place by the tabs 38 and the snap-in wedges 76. The lower index retainers keep the sidewall panel 10 at the designated water line 32, and restrict the attached sidewall panel 10 from moving inboard. A small amount of lateral movement will still be possible, since the lock strip 58 is slightly narrower than the channel 56, as discussed above, and because the entry opening of the lower index retainer (70, 80 in FIGS. 6-8) is slightly wider than the snap-in wedge 76. The lower index retainers 70, 80 and tabs 38 thus operate together to provide a "blind touch operation" for the sidewall installation.

At this point, the sidewall panel 10 will be generally kept in place but not securely locked in a finished position. It can be shifted around a bit for window alignment, or removed from the frame 12 by pulling the lock strip 58 all the way down, if desired. As with the tabs 38 in the receiving portions 62, the lower index retainers 70, 80 also allow a certain degree of left-right and up-down sidewall movements for window alignment.

Referring to FIGS. 10-14, after the tabs 38 are inserted into the respective receiving portions 62 and the wall panel 10 is positionally adjusted and aligned as desired (i.e. window alignment is completed), the wall panel 10 is held in place while the lock strip 58 is drawn down within the channel 56, so that the locking portion 64 of the locking slot 60 draws down around the tab 38 to lock the tab (and hence the wall panel 10) with respect to the frame member 12. With the lower index retainer 80 of FIGS. 7A and 7B, pulling the lock strip 58 down to the locking position will bring the lower ends of the slot frame bumpers 86 into contact with the top of the slide block 84, and thereby provide a mechanical block to further motion. This provides a positive signal to a worker that the lock strip 58 has been moved to the fully locked position. Once the lock strip 58 is pulled to the locked position, the locked sidewall panel 10 cannot be removed except by forcing it off and presumably damaging the attachment or the sidewall panel 10.

It will be apparent that with the wall panel 10 in rough position, and the lock strip 58 disposed on the back side of the spline 40, the lock strip will be substantially hidden from view or access. However, the lock strip 58 includes a pull tab 98 at its lower extremity, which extends below the bottom edge 22 of the wall panel 10. A user can grasp this pull tab 98 (visible in FIGS. 2, 3 and 6) either manually or with a tool, and pull downwardly, so that the lock strip 58 slides downwardly in its channel 56. This draws the respective receiving portion 62 of the lock strip downward so that the respective tab 38 slides into the adjacent locking portion 64 of the lock strip. As shown in the aircraft implementation depicted in the figures, the region below the bottom edges 22 of the wall panels 10 can be configured to be covered by removable ventilation panels 34, which cover the pull tabs 98 of the lock strips 58 after the installation of the wall panels 10.

Figure 12:
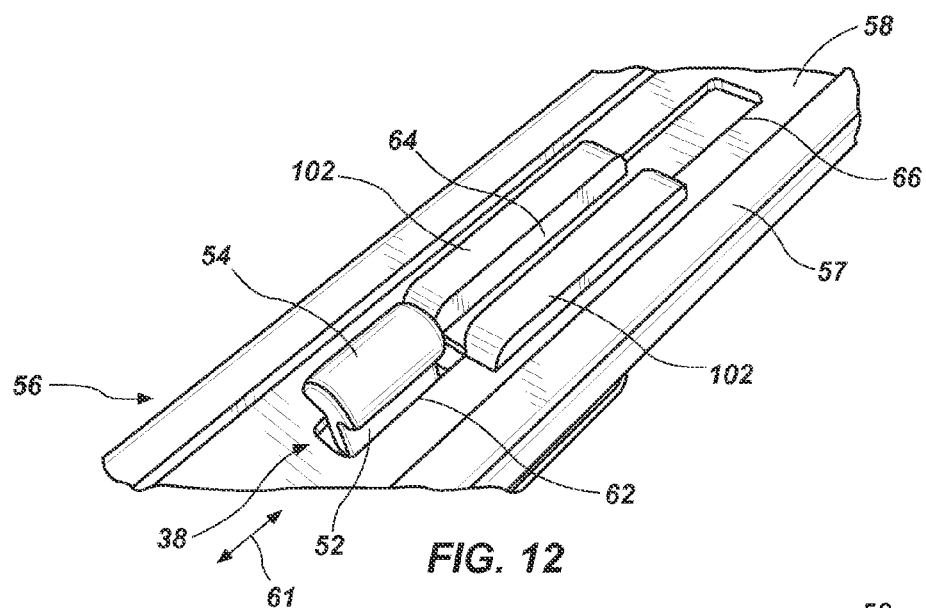
FIG. 12 is a rear perspective view of a tab inserted into the receiving portion of a lock strip of an embodiment of a wall installation system as disclosed herein.
Figure 13:
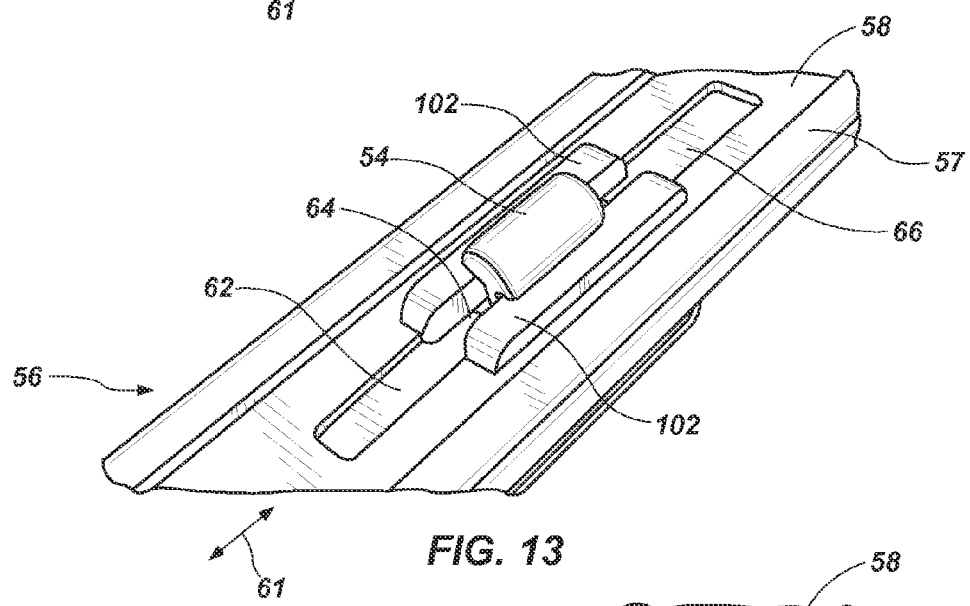
FIG. 13 is a rear perspective view of a tab locked in the locking portion of a lock strip of an embodiment of a wall installation system as disclosed herein.

The progression of the locking slot 60 moving with respect to the tab 38 from the receiving portion 62 into the locking portion 64 is apparent by viewing FIGS. 12 and 13. The locking portion 64 of the lock strip 58 includes wedge surfaces that are configured to lock the tab 38 in the locking portion 64 in two dimensions. Specifically, as shown in FIGS. 11-14, the locking portion 64 includes side walls 100, which draw laterally close together, like a pair of wedges, in order to bear against opposing sides of the stem portion 52 of the tab 38. This helps to positionally lock the tab with respect to the frame member 12 in the lateral direction (lateral relative to the orientation of the tab 38, fore and aft with respect to the aircraft). The locking portion 64 also includes a pair of uprising rims 102 on opposing sides of the locking slot 60, which bear against the underside of the distal bulb portion 54 of the tab, and thus provide wedge action that applies axial tension on the tab 38, tending to pull it further through the insert slot 48, thus drawing the wall panel 10 snugly against the spline 40 and positionally locking the tab 38 and the wall panel 10 to the spline 40 and thus to the frame member 12 in a friction lock. This secures the wall panel against the frame members 12.

When it is desired to remove a wall panel 10 from the frame 12 and spline 40, if the locking lower index retainer 80 of FIGS. 7A, B is used, a worker can reach under the bottom edge 22 of the panel and push the release tab 87 of the lower index retainer 80 to withdraw the slide block 84 from below the bumpers 86, and then pull the lock strip 58 further down within the channel 56 of the spline 40, so that the release portion 66 draws down around the tab 38. As can be seen in the FIGS. 10-14, the rims 102 end before the release portion 66 begins, thus releasing axial tension on the tab 38 as the lock strip 58 is drawn down. If the lower index retainer 70 of FIG. 6 is used, the lower index retainer does not have a release tab, and the worker can simply pull the lock strip 58 down to begin the removal process.

The release portion 66 of the lock strip is wider than the receiving portion 62, and does not hold the bulb 54 in a press fit or friction fit. Instead, because of the size of the release portion 66, the tab 38 merely rests loosely in the release portion, allowing the wall panel 10 to be easily removed from the frame members 12 when the lock strip is at this position. At the same time, the tabs 38 within the release portions 66, though loose, will still support the wall panel vertically, and thus prevent the wall panel from simply falling from the frame. This configuration of the locking slot 60 allows free removal of the tabs 38 from the release portion 66, allowing a worker to easily remove the wall panel from the frame, in a controlled and safe manner. The top edge 20 of the panel 10 will also be held in the upper alignment device 68, which will also help prevent the panel from falling away from the frame 12 when the lock strip 58 is pulled to the release position.

When the lock strip 58 is drawn down to the release position, the ridges 81 on the snap-in wedge 76 and the corresponding ridges 83 on the inside of the frame bumpers 86 (shown in FIGS. 8A, 8B) will also disengage, so that the snap-in wedge 76 can be snapped out of the lower index retainer 70, 80. At this point the snap-in wedges 76 will still be held in the lower index retainers 70, 80 by the upper clip members 73, 83. To finally remove the wall panel 10 from the frame members 12, each of the wedge elements 76 are removed from their respective lower index retainers 70, 80. This involves pulling the wall panel 10 away from the spline 40 and frame members 12, causing the upper slot 74 of the wedge elements to snap out of the upper clip members 73, 83 of the respective retainer clips. The lower index retainers 70, 80 thus help to horizontally and vertically support the wall panel 10 in position after all tabs 38 have been released, allowing a single worker to easily remove the entire panel 10, while preventing the panel from simply falling away from the wall frame 12 when the tabs have been released. After a wall panel 10 has been removed, it can be easily reattached in the manner discussed above, without damage to the wall panel 10 or other structure, and without compromising the strength of the connection.

To reset the lock strip 58 to the proper position for reattaching a wall panel 10 following removal, a worker can push the lock strip 58 upward (e.g. from the bottom) until it stops against the reset stop 94, as discussed above with respect to FIG. 9. While the lock strip 58 is relatively flexible and may not ordinarily function under axial compression, it can be pushed because it is laterally constrained within the channel 56 of the spline 40. Viewing FIG. 7B, as the bumpers 86 move upward and pass through the lower index retainer 80 during this action, the bumpers 86 will contact the sloped bottom surface 88 of the spring-loaded slide block 84 while moving up, and push the slide block 84 aside. Once the bumpers 86 pass the slide block 84, the slide block 84 will snap back to its forward position, producing an audible click sound. This click, in combination with the mechanical stop and hold provided by the reset stop 94, can confirm the reset to the worker. At this position, the receiving portions 62 of the locking slots 60 will be aligned with the insert slots 48 of the spline 40, and thus will be in position for snap-in reinsertion and attachment of the wall panel 10 in the manner explained above.

Figure 15:
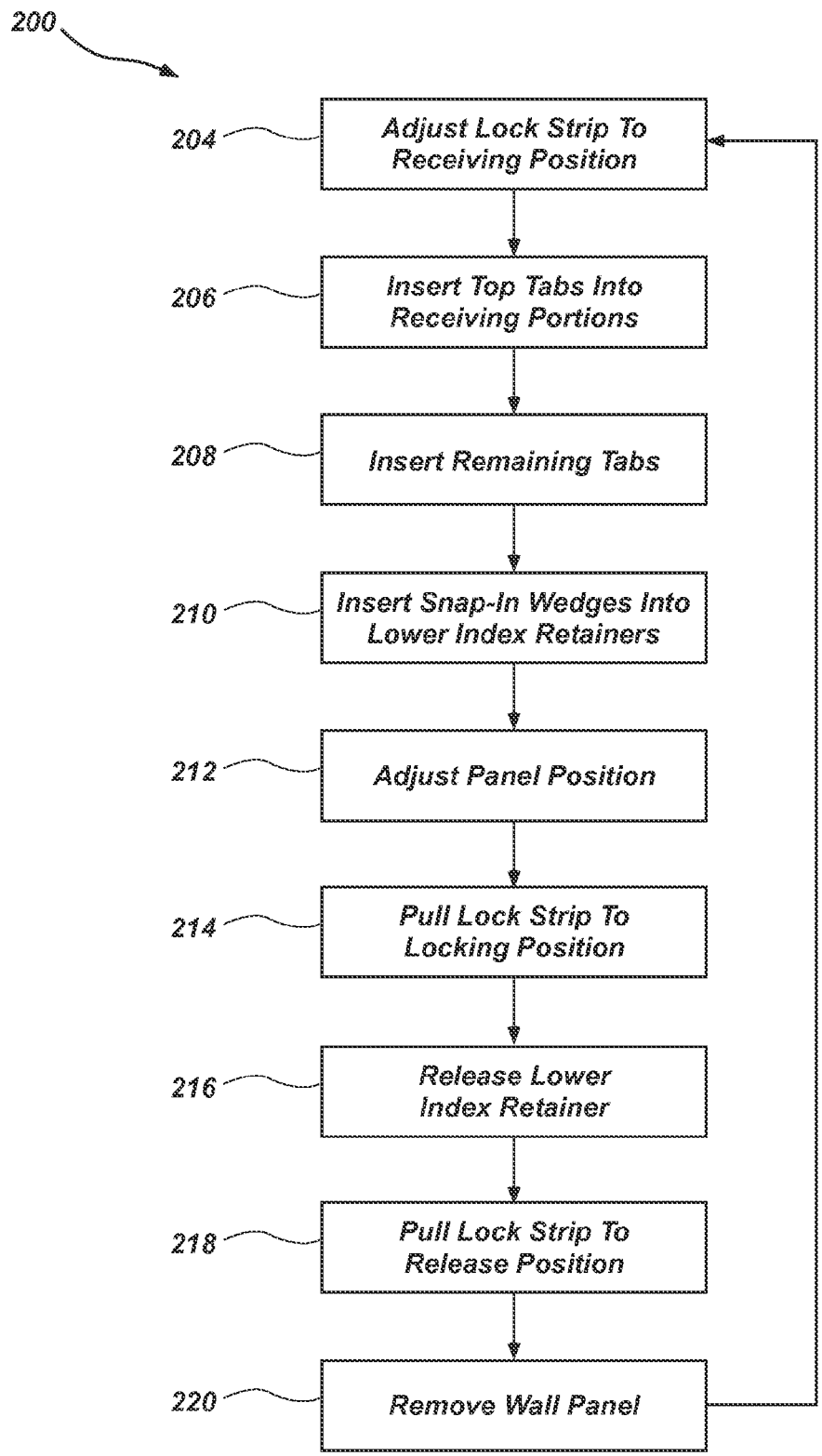
FIG. 15 is a flow diagram of an aircraft sidewall installation method in accordance with the present disclosure.

Embodiments of the disclosure may be described in the context of an aircraft sidewall installation method 200 as shown in FIG. 15 and an aircraft 202 as shown in FIG. 16. During production, maintenance or refurbishment of an aircraft 202, exemplary method 200 may include moving the lock strip to the receiving (or fully up) position 204 to prepare for receipt of a wall panel, and then inserting the top tabs 206. With reference to FIGS. 10 and 12-14, the term "receiving position" is used herein to denote the position of the lock strip 58 at which the receiving portion 62 of the locking slot 60 is aligned with the insert slot 48 of the spline 40, and is ready to receive the tabs 38. Referring back to the diagram of FIG. 15, the remaining tabs can be pushed into place 208, after which the snap-in wedges can then be inserted into their respective lower index retainers 210.

Steps 206-210 taken together constitute the overall step of inserting a plurality of tabs extending from the back of a wall panel into receiving portions of a three-position moveable lock strip. At this point, the worker can adjust the position of the wall panel 212, such as to center the window structure, etc., and then pull the lock strip to the locking position 214. With reference to FIGS. 10 and 12-14, this involves linearly pulling the lock strip 58 to align the locking portion 64 of the lock strip with the tabs 38, thereby fixing the position of the wall panel with respect to the aircraft frame members. The term "locking position" is used herein to denote the position of the lock strip 58 at which the locking portion 64 of the locking slot 60 is aligned with the tab 38. At this point, the wall panel is locked in place.

The exemplary method 200 shown in FIG. 15 also shows the steps in removing a wall panel. A worker first releases the lower index retainer 216, and then pulls the lock strip fully down to the release position 218. Again with reference to FIGS. 10 and 12-14, the term "release position" is used herein to denote the position of the lock strip 58 at which the release portion 66 of the locking slot 60 is aligned with the tab 38. At this point, the worker can remove the wall panel 220 from the structure. To prepare for future reinstallation of the wall panel, the worker can then return to the first step and adjust the lock strip to the receiving position 204.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 202 produced by exemplary method 200 may include an airframe 222, including a fuselage, with a plurality of systems 224 and an interior 226. Examples of high-level systems 224 include one or more of a propulsion system 228, an electrical system 230, a hydraulic system 232, and an environmental system 234. Any number of other systems may be included. Although an aerospace example is shown, the principles of the invention may be applied to other industries, such as the automotive industry.

Within the interior 226 of the aircraft, the wall panel installation system includes multiple splines 236, which are attached to the fuselage frame, with lock strips 238 slidably attached to the splines 236. As discussed above, the lock strips 238 each include a three-position locking slot 240, including a receiving portion 242, a locking portion 244 and a release portion 246. Also included in the interior 226 are wall panels 248 that include tabs 250, these tabs being configured to insert into the receiving portion 242 of the locking slot 240, and be locked into place by movement of the lock strip 238, as discussed above.

Apparatus and methods embodied herein may be employed during any one or more of the stages of the sidewall installation method 200. For example, components or subassemblies corresponding to method 200 may be fabricated or manufactured in a manner similar to components or subassemblies produced while the aircraft 202 is in service. Also, one or more apparatus embodiments, method embodiments, or a combination thereof may be utilized during production, for example, by substantially expediting assembly of or reducing the cost of an aircraft 202. Similarly, one or more of apparatus embodiments, method embodiments, or a combination thereof may be utilized while the aircraft 202 is in service, for example and without limitation, during maintenance and service.

The system and method disclosed herein addresses aircraft sidewall installation and positioning issues using a snap-in attachment approach that does not involve screws or tooling during installation. This wall panel attachment system 8 provides a simple, snap-in design, which allows sidewall panels 10 to push in and snap, keeping the sidewall panel in place without initially being locked. Before final locking of the sidewall panels, the worker can make appropriate adjustments for window alignment, etc. To lock the panels in place, the worker pulls the lock strip 58 down to lock at once all attaching devices that are associated with a single lock strip, without the need for additional hardware or tooling. Once the panels are locked in place, their position is securely fixed without the need for screws, washers, other fasteners.

Advantageously, installation and removal of these wall panels 10 can be accomplished by a single worker, without additional parts, fasteners or tooling. The installation and removal process is also very quick. It has been found that installation or removal of a sidewall according to this design can be routinely accomplished in half a minute or less. More specifically, it has been found that installation of a sidewall panel can be accomplished in about 20 seconds or less by a single worker without significant risk or expectation of system deformation or gaps. The steps of attaching or removing a wall panel have each been found to take about 10 seconds or less using this system. When attaching the wall panel, alignment with adjacent panels and adjustment and centering of the sidewall to a structural window can add another 10 seconds to the process.

This system and method thus offers a simple and secure sidewall installation. In one embodiment it reduces the number of structural attachments to the airframe from eight to three, and reduces the use of shock-mount brackets and related spacers. It can help speed sidewall installation and improve aircraft production rates during manufacture. It also saves time and expense for aircraft users by reducing the time and labor that is typically involved in regular airplane mandatory checks and maintenance procedures that involve sidewall removal, and helps reduce damage and wear to panels that can often result from removal and reinstallation.

It should also be appreciated that the wall panel installation system 8 disclosed herein is not limited to use in aircraft. For example, a wall panel installation system and method as disclosed herein can be used for room dividers, where removable panels are desired. This system and method could also be used for automotive interiors and cabinetry, for example, where it is desirable to hide equipment behind a panel, and yet be able to remove the panel for maintenance, if desired. Those of skill in the art will recognize that other applications are also possible.

Although the wall installation system and method disclosed herein has been described in terms of certain specific embodiments, it is to be understood that other embodiments that are apparent to those of ordinary skill in the art, including embodiments that do not provide all of the features set forth herein, are also within the scope of this disclosure. Those skilled in the art will recognize that the teachings contained herein can be practiced with various modifications within the scope of the claims. Accordingly, the scope of the present disclosure is defined only by reference to the appended claims and equivalents thereof.

What is claimed is:

1. A system for attaching a wall panel, comprising: a wall panel, having a back and a tab extending from the back; and a lock strip, moveably attached to a wall frame member, having a three-position locking slot, the lock strip including: a receiving portion configured to receive the tab; a locking portion configured to lock the tab with respect to the frame member; and a release portion configured to release the tab, the locking portion being disposed between the receiving portion and the release portion, wherein the receiving portion, the locking portion, and the release portion are substantially linearly aligned; the wall panel being removably attachable to the frame member by inserting the tab into the receiving portion and linearly moving the lock strip to a locking position to lock the tab in the locking portion.

2. A system in accordance with claim 1, further comprising a spline, having a channel, fixedly attached to the frame member, the lock strip being moveably disposed in the channel.

3. A system in accordance with claim 2, further comprising an insert slot, disposed in the spline, corresponding to a position of the locking slot, to allow passage of the tab into the locking slot.

4. A system in accordance with claim 1, wherein the tab comprises a substantially rigid, upstanding member having a distal bulb end configured to engage the receiving portion of the locking slot in a friction fit.

5. A system in accordance with claim 1, wherein the locking portion includes wedge surfaces oriented to lock the tab in the slot in two dimensions.

6. A system in accordance with claim 1, wherein the wall panel is an aircraft interior panel, and the frame member is a rib of an aircraft fuselage.

7. A system in accordance with claim 1, further comprising:
a wedge, extending from the back of the wall panel; and
an index retainer, attached to the frame member, configured to releasably receive and support the panel via the wedge upon initial attachment of the panel to the frame.

8. A system in accordance with claim 7, wherein the index retainer provides a mechanical stop for the lock strip when at the locking position.

9. A system in accordance with claim 1, wherein the wall panel is removable from the frame by linearly moving the lock strip to align the release portion with the tab.

10. A system in accordance with claim 9, wherein the release portion has a largest size, and the locking portion has a smallest size of the three-position locking slot.

11. An aircraft, comprising:
an airframe fuselage having a plurality of substantially parallel frame members;
a spline, fixedly attached to the frame members;
an interior wall panel, having a back and a plurality of tabs extending from the back; and
a lock strip, linearly moveably disposed in the spline, having a plurality of three-position locking slots, each locking slot extending through a thickness of the lock strip, the lock strip including:
a receiving portion configured to receive one of the plurality of tabs;
a locking position having a locking portion of the slot configured to positionally lock the one of the plurality of tabs with respect to the frame member; and
a release portion configured to allow removal of the one of the plurality of tabs from the slot, the locking portion being disposed between the receiving portion and the release portion, the receiving portion, the locking portion and the release portion being substantially linearly aligned.

12. An aircraft in accordance with claim 11, wherein the interior wall panel is removable from the frame by linearly moving the lock strip to align the release portion with the one of the plurality of tabs.

13. An aircraft in accordance with claim 11, wherein the one of the plurality of tabs comprises a substantially rigid, upstanding member having a distal bulb end configured to engage the receiving portion of the locking slot in a friction fit.

14. An aircraft in accordance with claim 11, wherein the release portion has a largest size, and the locking portion has a smallest size of the three-position locking slot.

15. An aircraft in accordance with claim 11, wherein the locking portion includes wedge surfaces oriented to lock the one of the plurality of tabs in the slot in two dimensions.

16. A method for installing a wall panel in an aircraft fuselage interior, the method comprising: inserting a plurality of tabs extending from a back of a wall panel into receiving portions of three-position moveable lock strips respectively associated with at least two frame members of the fuselage, the three-position moveable lock strips further including locking portions and release portions substantially linearly aligned with the receiving portions; the locking portions being disposed between the receiving portions and the release portions; and linearly pulling the lock strips with respect to the wall panel and the respective frame member, to align the locking portions of the lock strips with the tabs, thereby establishing a fixed position of the wall panel with respect to the frame members.

17. A method in accordance with claim 16, further comprising adjusting a position of the wall panel prior to linearly pulling the lock strips to lock the wall panel into the fixed position.

18. A method in accordance with claim 16, wherein linearly pulling the lock strips comprises pulling the lock strips downwardly with respect to the wall panel and the frame members.

19. A method in accordance with claim 16, further comprising:
linearly pulling the lock strips to align the release portions of the lock strips with the tabs; and drawing the tabs out of the release portions while drawing the wall panel away from the frame members, to remove the wall panel from the frame members.

20. A method in accordance with claim 19, wherein linearly pulling the lock strips comprises pulling the lock strips downwardly with respect to the wall panel and the frame members.

* * * * *